United States Patent
Yun et al.

(10) Patent No.: US 9,850,978 B2
(45) Date of Patent: Dec. 26, 2017

(54) ROLL MOUNT

(71) Applicant: Hyundai Motor Company, Seoul (KR)

(72) Inventors: Jae-Hyung Yun, Gyeonggi-do (KR); Hyoung-Jin Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/145,694

(22) Filed: May 3, 2016

(65) Prior Publication Data

US 2017/0167565 A1 Jun. 15, 2017

(30) Foreign Application Priority Data

Dec. 14, 2015 (KR) .................. 10-2015-0178204

(51) Int. Cl.
*B60K 5/12* (2006.01)
*F16F 13/30* (2006.01)
*F16F 13/08* (2006.01)

(52) U.S. Cl.
CPC .......... *F16F 13/305* (2013.01); *B60K 5/1208* (2013.01); *B60K 5/1241* (2013.01); *B60K 5/1283* (2013.01); *F16F 13/08* (2013.01)

(58) Field of Classification Search
CPC ...... F16F 13/305; F16F 13/08; B60K 5/1208; B60K 5/1283
See application file for complete search history.

(56) References Cited

U.S. PATENT DOCUMENTS

| | | | | |
|---|---|---|---|---|
| 6,412,761 B1* | 7/2002 | Baudendistel | ........ | F16F 13/105 267/140.14 |
| 6,681,905 B2* | 1/2004 | Edmondson | ......... | B60G 13/001 188/130 |
| 7,063,191 B2* | 6/2006 | Hopkins | ............... | F16F 13/305 188/267.2 |
| 2007/0144843 A1* | 6/2007 | Bodie | ................... | F16F 13/105 188/267 |
| 2007/0246872 A1* | 10/2007 | Loheide | ................ | F16F 13/305 267/140.15 |

(Continued)

FOREIGN PATENT DOCUMENTS

JP 05-319108 A 12/1993
JP 2001-208127 A 8/2001

(Continued)

*Primary Examiner* — Vishal Sahni
(74) *Attorney, Agent, or Firm* — Mintz Levin Cohn Ferris Glovsky and Popeo, P.C.; Peter F. Corless

(57) ABSTRACT

A roll mount is provided and includes a rubber coupled to a core mounted in an exterior pipe coupled to an end of a main body, slits that are formed in the rubber at the periphery of the core, and a pocket that is disposed within the slits. The pocket includes a first pocket portion having a first and second chamber formed therein and connecting portions having flow paths that connect the first and second pocket portion and place the first and second chamber in fluid communication. A magnetorheological fluid is encapsulated in the first and second chamber, and flows therethrough, via the flow paths based on elastic deformation of the first and second pocket portion. The wound coils are disposed at exterior sides of the first and second pocket portions, and fluidity of the magnetorheological fluid is adjusted based on the electric current applied to the coil.

6 Claims, 5 Drawing Sheets

(56) References Cited

U.S. PATENT DOCUMENTS

2010/0300819 A1* 12/2010 Hiemenz ................ F16F 9/537
                                                                                                     188/267.2
2016/0273642 A1* 9/2016 Yoon ..................... F16H 57/021

FOREIGN PATENT DOCUMENTS

| KR | 2000-0004066 A | 1/2000 |
| KR | 10-2007-0002363 A | 1/2007 |
| KR | 10-2011-0053567 A | 5/2011 |
| KR | 2014-0141077 A | 12/2014 |

* cited by examiner

RELATED ART

ROLL MOUNT

CROSS-REFERENCE TO RELATED APPLICATIONS

This application claims priority under 35 U.S.C. §119 to Korean Patent Application No. 10-2015-0178204, filed on Dec. 14, 2015, in the Korean Intellectual Property Office, the disclosure of which is incorporated herein by reference in its entirety.

BACKGROUND

1. Field of the Invention

The present invention relates to a roll mount connected to a point where vibration occurs such as a connecting point between a vehicle body and an engine or a connecting point between a sub-frame and a transmission, and mounted to attenuate vibration and support a load, and more particularly, to a roll mount having a pocket with an encapsulated magnetorheological fluid (MRF) and coupled to rubber, to actively adjust the damping performance and load supporting force based on application of an electric current.

2. Description of the Related Art

Generally, an engine for a vehicle is coupled to a transmission and mounted in an engine room. In particular, the engine is mounted by being coupled to an engine mount and a transmission mount to support the loads of the engine and the transmission and to attenuate vibration being transmitted to a vehicle body.

The engine or the transmission is positioned on the engine mount or the transmission mount, or the engine mount or the transmission mount is connected to one side of the engine or the transmission. Further, one or more roll mounts are additionally mounted to share and support a variation in load of the engine and the transmission that is generated by inertia of the vehicle. In other words, the engine mount and the transmission mount support loads of the engine and the transmission at both sides of the engine and the transmission, respectively. The roll mounts, are attached and installed to lower sides of the engine and/or the transmission, and are additionally connected to the engine or the transmission, to displacement control and vibration damping.

As shown in the related art with reference to FIG. 1 a structure of the roll mount includes, exterior pipes 11 coupled to both ends of a main body 10 of the roll mount which has a straight or bent bar shape, respectively. Further, rubbers 12 having elasticity and cores 13 positioned at a center of the rubbers 12 are coupled in the exterior pipes 11. The core 13 has a hollow pipe shape to be coupled to a vehicle body member, a sub-frame, the engine, the transmission, and the like by bolting, fastening or the like. The rubber 12 is elastically deformed by loads and vibration input through the core 13.

Additionally, the front exterior pipe and the rear exterior pipe may be formed with a variety of sizes to provide alternate size configurations of the rubber 12 based on the load at the connecting point and the inputted vibration. Further, a larger rubber is fastened to an exterior pipe having an increased diameter, that improves the load supporting force and vibration damping performance. Furthermore, to improve the vibration damping performance (e.g., to induce a greater degree of elastic deformation), the rubber 12 is partially removed (e.g., cut out) to additionally form slits 14 e.g., the slits penetrate upper and lower surfaces of the rubber 12).

Typically, in the roll mount configured as described above, the front core, coupled to the relatively larger rubber, is mounted (e.g., coupled) to a lower portion of the transmission or the engine where vibration occurs. The rear core is coupled to a relatively smaller rubber and is mounted (e.g., coupled) to the vehicle body or the sub-frame. Therefore, the roll mount supports the loads of the engine and the transmission and attenuates vibration. In particular, as a result, the roll mount significantly affects the noise, vibration, and harshness (NVH) performance, handling performance, and the like of the vehicle. In other words, the roll mount is a component that impacts the rolling behavior control for the engine. Accordingly, the noise and vibration felt by passengers may be reduced and the improved performance of the roll mount may improve driving performance of the vehicle.

To improve driving performance of the vehicle (e.g., to more secure support the load of the engine or the transmission) the rubber 12 needs to be manufactured using a material having a relatively low elastic coefficient. However, there is a problem in that vibration is transmitted to the interior of the vehicle when the engine idles. Conversely, when the rubber 12 is manufactured using a material having a high elastic coefficient, the vibration damping performance is improved, but the load supporting performance deteriorates. Therefore, there is a need for a roll mount which is capable of maintaining low characteristics (e.g., a state in which elastic deformation may be more easily carried out) when the engine idles, and adjusts characteristics in response to a driving state when the vehicle starts to move or travels.

SUMMARY

The present invention provides a roll mount that maximizes vibration damping performance and driving performance by the adjustment of characteristics of a rubber based on a driving state of a vehicle.

An exemplary embodiment of present invention provides a roll mount in which a rubber coupled to a core may be mounted in an exterior pipe coupled to an end of a main body. Slits may be formed in the rubber at the periphery of the core and a pocket may be disposed therein by being fitted into the slits. The pocket may include a first pocket portion having a first chamber formed therein, a second pocket portion having a second chamber formed therein, and connecting portions that may have flow paths that connect the first pocket portion and the second pocket portion. The flow paths may allow the first chamber and the second chamber to be in fluid communication with each other, and a magnetorheological fluid may be encapsulated in the first chamber and the second chamber. The magnetorheological fluid may flow through the first chamber and the second chamber via the flow paths based on the elastic deformation of the first pocket portion and the second pocket portion. Further, wound coils may be disposed at exterior sides of the first pocket portion and the second pocket portion, and fluidity of the magnetorheological fluid may be adjusted based on the amount of electric current applied to the coil.

In some exemplary embodiments, the slits may be formed at a first side and a second side around the core, one on each side, respectively. The first pocket portion and the second pocket portion may be detachably disposed within the slits, respectively, and an opening portion may be formed to position the core between the first pocket portion and the second pocket portion.

The coil may be disposed on upper surfaces of the first pocket portion and the second pocket portion. Furthermore, the coil may be wound in a spiral manner to extend radially from a center of the open portion between the first pocket portion and the second pocket portion. The wound portions of the coil in direct contact with the first pocket portion and the second pocket portion may have a greater number of turns of the coil than at portions of the coil with indirect contact with the first pocket portion and the second pocket portion. In other words, as illustrated in FIG. 3, the coil may have an increased winding density in a direction from f to e.

The exemplary embodiment may further include a second coil disposed on lower surfaces of the first pocket portion and the second pocket portion. The second coil may be wound in a spiral manner that extends radially from the center of the open portion between the first pocket portion and the second pocket portion. The connecting portion may be formed in outward convex arc shape (e.g., to minimize flow resistance of the MRF by forming the flow paths in a circular shape). The connecting portions may include a first connecting portion that connects the first pocket portion and the second pocket portion to each other at a first side, and a second connecting portion that connects the first pocket portion and the second pocket portion to each other at a second side. An exterior pipe that has a reduced diameter may be connected to a rear end of the main body, an exterior pipe that has a greater diameter may be connected to a front end of the main body. The pocket may be mounted (e.g., coupled) within the exterior pipe connected to the front end of the main body.

Furthermore, the magnetorheological fluid (MRF) includes suspension that may be formed by mixing a synthetic hydrocarbon liquid and soft particles with a magnetism, and may include characteristics of the shear stress thereof varying based on whether a magnetic field forms at the periphery of the magnetorheological fluid and based on the intensity of the magnetic field. Since commercially available products may be used as the magnetorheological fluid, specific descriptions regarding data and characteristics of the magnetorheological fluid will be omitted herein.

According to the exemplary embodiments that have the aforementioned configurations, elastic behavior of the rubber may vary based on the application of the electric current, and the vibration damping performance and load supporting performance based on a driving state of a vehicle may be improved. In other words, vibration and noise being transmitted to the interior of the vehicle may be reduced (e.g., minimized) by increasing vibration damping performance when the engine idles. Additionally, the load supporting performance when the vehicle travels may be improved by securely supporting the rolling behavior of the engine. Since the pocket may be coupled by being detachably disposed within the slit formed in the rubber, the pocket may be more easily disposed in a roll mount than in the related art.

Since the coil and the second coil have an increased winding density at the portions where the coil and the second coil are in direct contact with the first pocket portion and the second pocket portion in which the magnetorheological fluid may be encapsulated, the magnetic force on the magnetorheological fluid may be concentrated. The roll mount may include a structure operated even though the coil includes a single wire, and a magnetic field may be adjusted based on wire density of the coil, and may include a change in the magnetic field to tune the roll.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
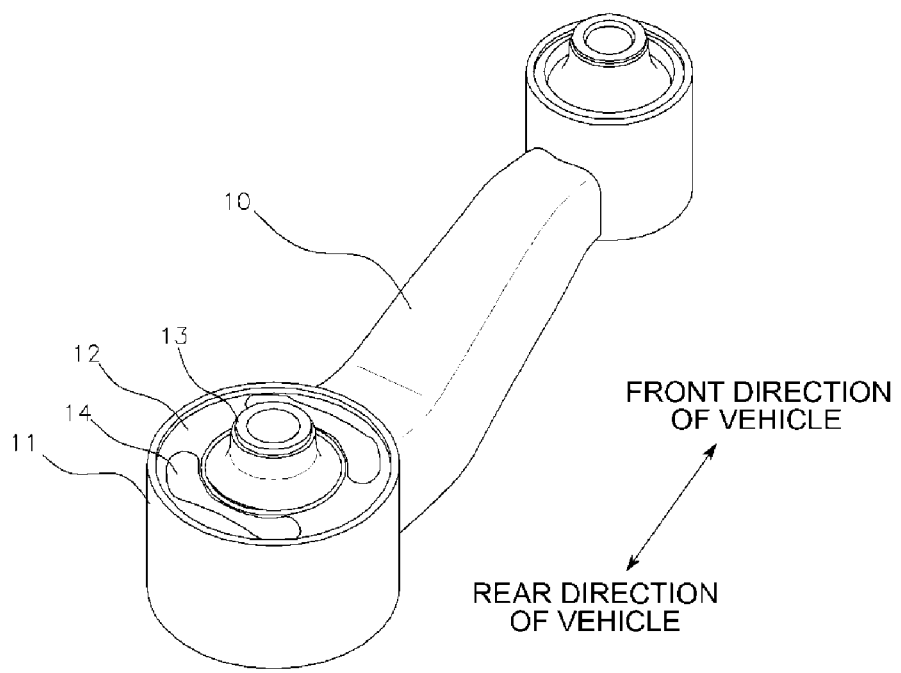
FIG. 1 is an exemplary view illustrating an appearance of a typical roll mount in accordance with the related art.

Hereinafter, the present invention will be described in detail with reference to the accompanying drawings so that those skilled in the technical field to which the present invention pertains may easily carry out the present invention. However, the present invention may be implemented in various different ways, and is not limited to the exemplary embodiment described herein. On the contrary, the invention is intended to cover not only the exemplary embodiments, but also various alternatives, modifications, equivalents and other exemplary embodiments, which may be included within the spirit and scope of the invention as defined by the appended claims. Wherever possible, the same reference numbers will be used throughout the drawings to refer to the same or like parts.

A part irrelevant to the description will be omitted to clearly describe the present invention, and the same or similar constituent elements will be designated by the same reference numerals throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
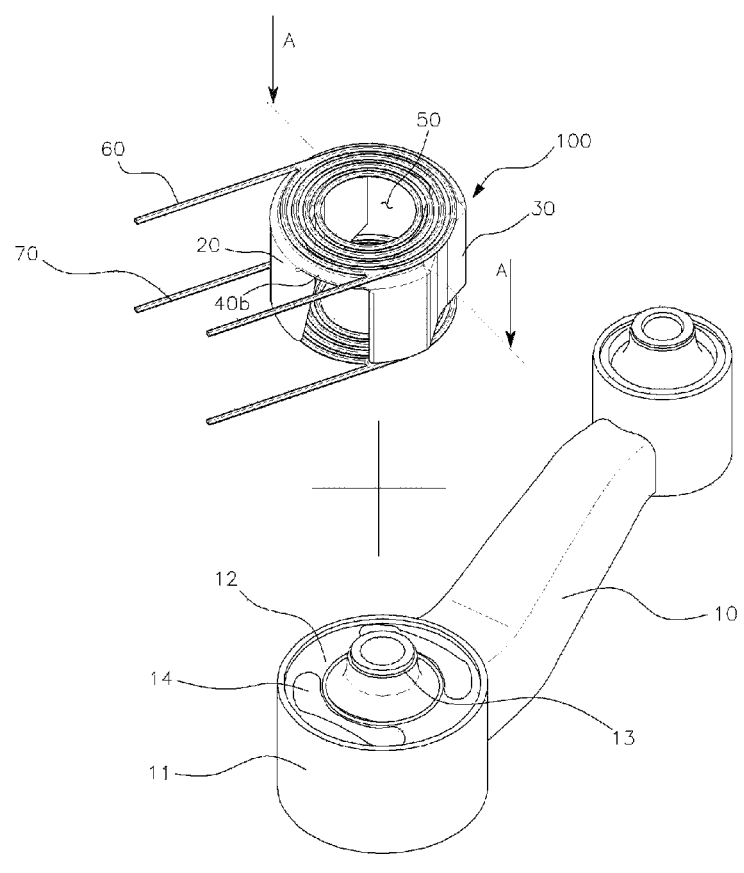
FIG. 2 is an exemplary view illustrating a state in which a pocket according to an exemplary embodiment is coupled to a roll mount in the related art, and then a coil and a second coil are coupled to an upper surface and a lower surface of the pocket, respectively.
Figure 2:
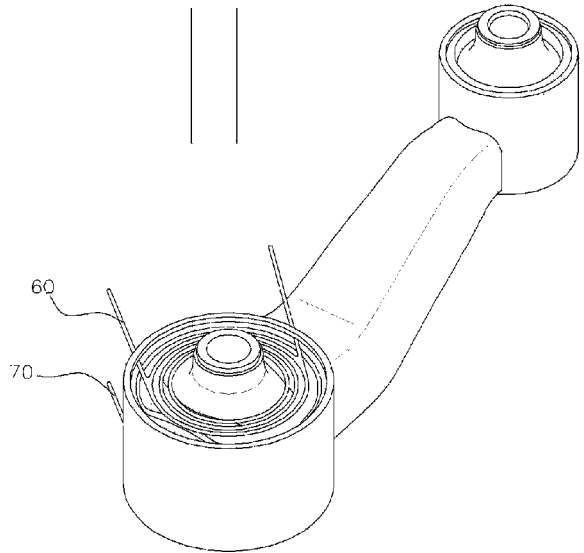

A roll mount in accordance with an exemplary embodiment, may include a rubber 12, coupled to a core 13, mounted in an exterior pipe 11 and coupled to an end of a main body 10. Further, a plurality of slits 14 may be formed in the rubber 12 disposed at the periphery of the core 12. For example as illustrated in FIG. 2, a pocket 100 may be disposed within the slits 14. A first coil 60 and a second coil 70 may be coupled to an upper surface and a lower surface of the pocket 100 (e.g., exposed at upper and lower sides of the exterior pipe), respectively, after the pocket 100 is fitted into the slits 14.

The pocket 100 may have a particular shape to facilitate insertion into the roll mount in the related art which has the rubber 12 formed with the slits 14, and may be removably attached or detached from the slits 14. The pocket 100 may include a a first pocket portion 20 and a second pocket portion 30 connected by a plurality of connection portions that may include a first connecting portion 40a and a second connecting portion 40b. As indicated by a point where the first pocket portion may be positioned (a), a point where the second pocket portion may be positioned (b), a point where the first connecting portion may be positioned (c), and a point where the second connecting portion may be positioned (d) in FIG. 3, the pocket 100 has a structure where the second pocket portion 30 may be disposed to be separated (e.g., spaced apart) from the first pocket portion 20. For example, an opening portion 40 may include the core 13 positioned therein and may be formed, and both sides of the first pocket portion 20 may be connected to both sides of the second pocket portion 30, respectively via the first connecting portion 40a and the second connecting portion 40b. In other words, in an exemplary embodiment, the slits 14 may be formed at a first side and a second side disposed around the core 13, one on each side. Further, the first pocket portion 20 and the second pocket portion 30 may be disposed within the slits 14, respectively and correspondingly. The opening portion 40 may be formed to position the core 13 between the first pocket portion 20 and the second pocket portion 30.

Figure 4:
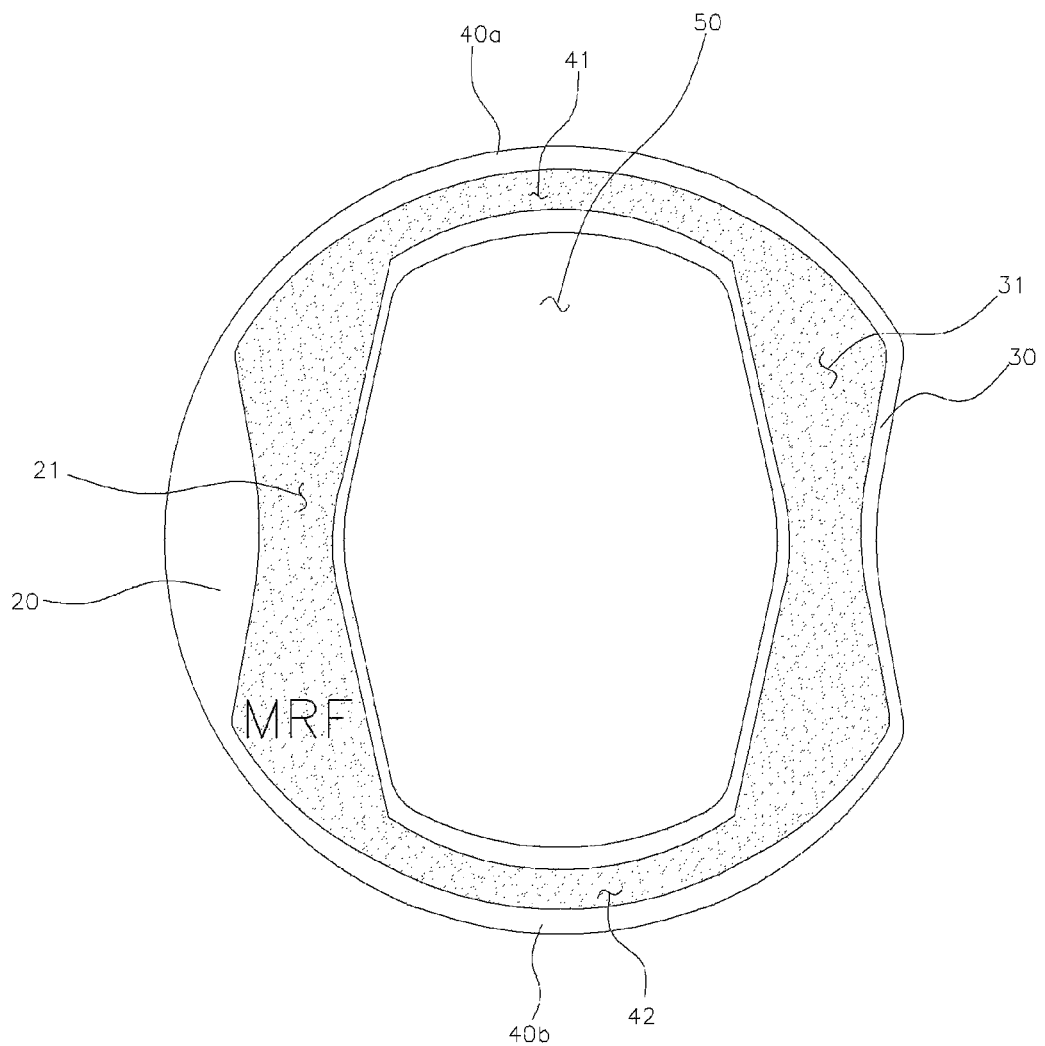
FIG. 4 is an exemplary view illustrating a state in which part A-A of FIG. 2 is cut out according to an exemplary embodiment.

A first chamber 21 may be formed in the first pocket portion 20 to allow the first chamber 21 to be filled with a magnetorheological fluid, and a second chamber 31 may be formed in the second pocket portion 30 to allow the second chamber 31 to be filled with the magnetorheological fluid. Further, as illustrated in FIG. 4, flow paths 41 and 42, which allow the first chamber 21 and the second chamber 31 to communicate with each other, may be formed in the first connecting portion 40a and the second connecting portion 40b, respectively.

The flow paths 41 and 42 in the first connecting portion 40a and the second connecting portion 40b may be formed in a circular shape and each of the flow paths 41 and 42 may be formed in an outward convex arc shape to minimize flow resistance of the magnetorheological fluid. Therefore, when the first pocket portion 20 and the second pocket portion 30 of the pocket 100 according to the exemplary embodiment are fitted into the slits 14, the pocket 100 may be positioned in the exterior pipe 11.

A predetermined amount of magnetorheological fluid may be encapsulated within the first chamber 21 and the second chamber 31, and the magnetorheological fluid may move to both sides through the flow paths 41 and 42. Since the first pocket portion 20 and the second pocket portion 30 may be disposed at both sides with the core 13 interposed therebetween, either the first pocket portion 20 or the second pocket portion 30 may be elastically compressed together with the rubber 12 when a load is exerted on the core 13. Therefore, when the first pocket portion 20 and the second pocket portion 30 are elastically deformed based on behavior of an engine, the magnetorheological fluid may flow through the first chamber 21 and the second chamber 31 via the flow paths 41 and 42. When the magnetorheological fluid is not subjected to a magnetic field, the magnetorheological fluid may have properties similar to a typical fluid (e.g., a hydraulic liquid encapsulated in a hydraulic mount), and will thereby preclude any meaningful influence on the elastic deformation of the first pocket portion 20 and the second pocket portion 30.

Figure 5:
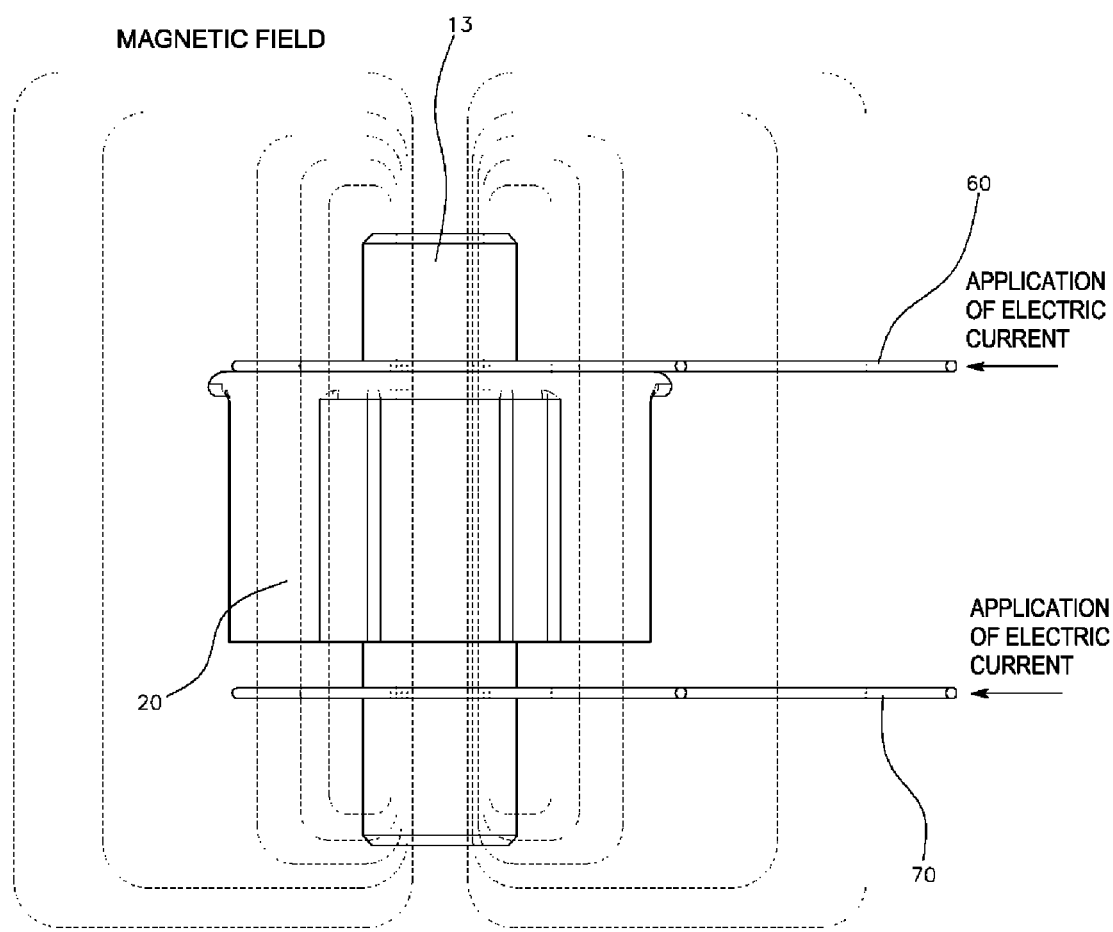
FIG. 5 is an exemplary view indicating a magnetic field, which is formed at the periphery of the coil and the second coil due to the application of electric current, by dotted lines according to an exemplary embodiment.

As described above, the coil 60 and the second coil 70, may be wound in a spiral manner, and may be disposed on the upper surfaces and the lower surfaces of the first pocket portion 20 and the second pocket portion 30. As shown in FIG. 5, when an electric current is applied to the coil 60 and the second coil 70, a magnetic field may be formed at the periphery of the coil 60 and the second coil 70. When the magnetic field is formed, shear stress of the magnetorheological fluid may increase, and the fluidity of the magnetorheological fluid may be reduced (e.g., the flow of the magnetorheological fluid may be suppressed since the magnetorheological fluid has similar properties to a solid). Therefore, the elastic deformation of the first pocket portion 20 and the second pocket portion 30 may be decreased or suppressed, and a degree of elastic deformation of the rubber 12 may be decreased, a supporting force of the roll mount may be provided.

In some exemplary embodiments, the pocket 100 may be disposed within the slits 14, the coil 60 and may be disposed on the upper surfaces of the first pocket portion 20 and the second pocket portion 30, the second coil 70 may be disposed on the lower surfaces of the first pocket portion 20 and the second pocket portion 30. Further, each of the first coil 60 and the second coil 70 may have a shape wound in a spiral manner to position each of the first coil 60 and the second coil 70 to extend radially from a center of the opening portion 50. In particular, the intensity of the magnetic field may increase with the density of the coil winding, and the shear stress exerted on the magnetorheological fluid may be increased in proportion to the intensity of the magnetic field. Accordingly, the number of turns of the first coil 60 and the second coil 70 may be greater at portions where the first coil 60 and the second coil 70 are in direct contact with the first pocket portion 20 and the second pocket portion 30 than at portions where the first coil 60 and the second coil 70 have indirect contact with the first pocket portion 20 and the second pocket portion 30.

Figure 3:
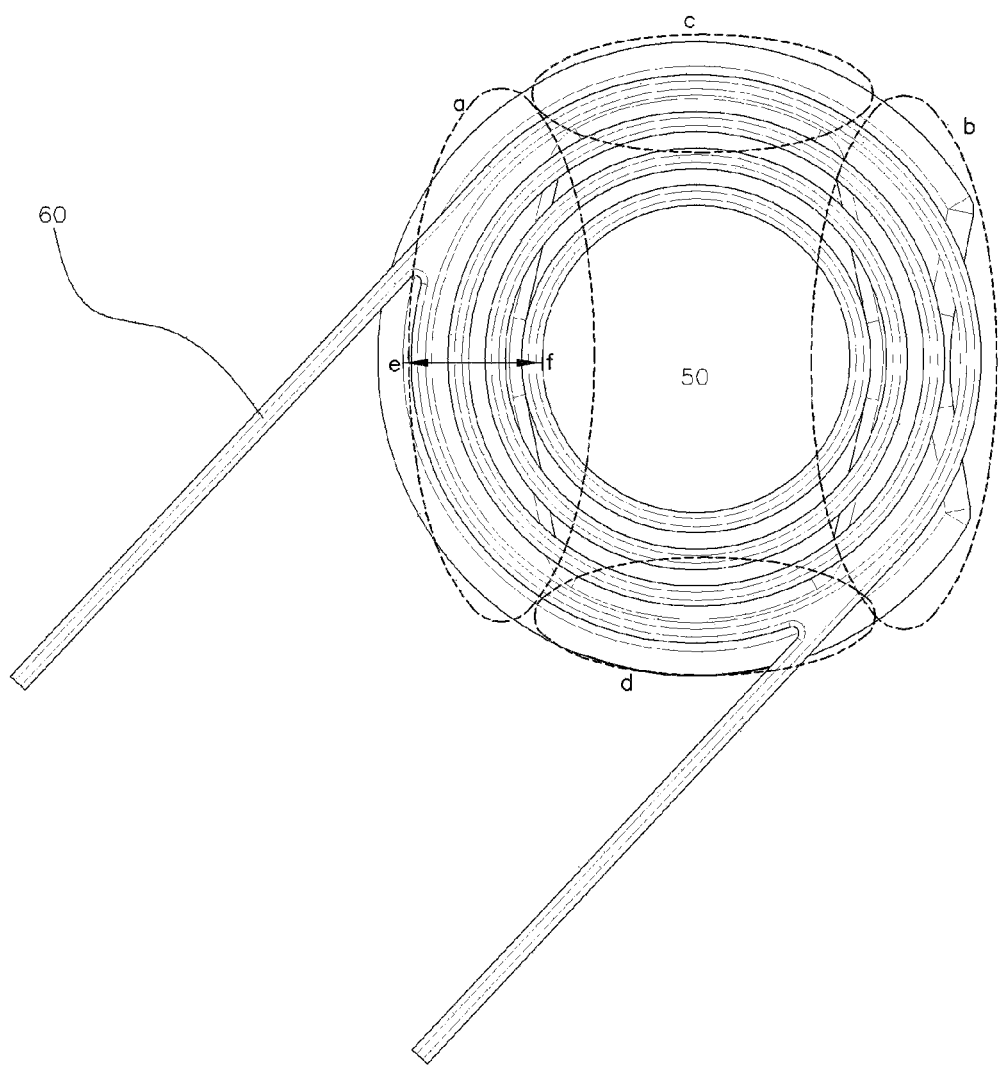
FIG. 3 is an exemplary view indicating points where a first chamber, a second chamber, and flow paths are formed in the pocket according to an exemplary embodiment, by a first chamber (a), a second chamber 9b), a first flow path (c), and a second flow path (d), respectively.

For example, as illustrated in FIG. 3, the first coil 60 and the second coil 70 have an increased winding density in a direction that extends from f to e. The pocket 100 according to an exemplary embodiment may be mounted in any one or both of the rear rubber and the front rubber of the main body 10 of the roll mount. Alternatively, the pocket 100 may be mounted in the rubber positioned in the exterior pipe, that may be connected with the engine and may have a relatively greater diameter, in consideration of production costs and utilization of a mounting space.

The exemplary embodiment may increase the vibration damping performance by cutting off the application of the electric current when the engine idles. Furthermore the driving performance may be improved by permitting the application of the electric current and increasing supporting force when the vehicle travels and rolling motion of the engine occurs. The roll mount performance associated with the ride and handling (R&H) characteristics may be more precisely controlled by minute adjustments to the application of the electric current based on the driving condition. Since the pocket 100 and the coil 60 may be attachable and detachable, the roll mount may be adopted as an option when selecting a vehicle. Furthermore, components may be replaced in a cost effective way in the event of breakdown of the components.

In an exemplary embodiment, the size of the structure that the coil is mounted on may be reduced because the coil 60 and the second coil 70 are mounted on the upper surfaces and the lower surfaces of the first pocket portion 20 and the second pocket portion 30 which are exposed, respectively as, compared to a structure in which the coil is mounted on an exterior surface of the exterior pipe. Additionally, the above described configuration may resolve an interference with peripheral components. Since the electric current may be applied to any one or both of the first coil 60 and the second coil 70, the fluidity of the magnetorheological fluid may be more precisely controlled.

The present invention, which has been described above, is not limited by the aforementioned exemplary embodiment and the accompanying drawings, and it is obvious to those skilled in the art to which the present invention pertains that various substitutions, modifications and alterations may be made without departing from the spirit and scope of the invention as defined by the appended claims and can also belong to the scope of the present invention.

What is claimed is:

1. A roll mount comprising:
    a rubber coupled to a core is mounted in an exterior pipe coupled to an end of a main body, slits are formed in the rubber at a periphery of the core, and a pocket is disposed within the slits, wherein the pocket includes:
    a first pocket portion having a first chamber formed therein;
    a second pocket portion having a second chamber formed therein; and
    connecting portions that have flow paths that connect the first pocket portion and the second pocket portion and the first chamber and the second chamber are in fluid communication with each other,
    wherein a magnetorheological fluid is encapsulated in the first chamber and the second chamber, the magnetorheological fluid flows through the first chamber and the second chamber via the flow paths based on elastic deformation of the first pocket portion and the second pocket portion, a coil is wound at exterior sides of the first pocket portion and the second pocket portion, and fluidity of the magnetorheological fluid is adjusted based on the amount of electric current applied to the coil,
    wherein the slits are formed at a first side and a second side around the core, one on each side, respectively, the first pocket portion and the second pocket portion are detachably coupled to the slits, respectively, and an opening portion is formed to dispose the core between the first pocket portion and the second pocket portion, and
    wherein the coil is disposed on upper surfaces of the first pocket portion and the second pocket portion, and wound in a spiral orientation that extends radially from a center of the opening portion between the first pocket portion and the second pocked portion.

2. The roll mount of claim 1, wherein the coil is wound with the number of turns of the coil greater at portions where the coil is in direct contact with the first pocket portion and the second pocket portion than at portions where the coil is in indirect contact with the first pocket portion and the second pocket portion.

3. The roll mount of claim 1, further comprising:
    a second coil disposed on lower surfaces of the first pocket portion and the second pocket portion, and wound in a spiral orientation that extends radially from the center of the opening portion between the first pocket portion and the second pocket portion.

4. The roll mount of claim 1, wherein the connecting portion is formed in an outward convex arc shape.

5. The roll mount of claim 4, wherein the connecting portions include a first connecting portion that connects the first pocket portion and the second pocket portion at a first side with each other, and a second connecting portion that connects the first pocket portion and the second pocket portion at a second side with each other.

6. The roll mount of claim 5, wherein a diameter of an exterior pipe connected to a rear end of the main body is smaller than a diameter of an exterior pipe connected to a front end of the main body, and the pocket is mounted in the exterior pipe connected to the front end of the main body.

* * * * *